US011729023B2

(12) United States Patent
Elliott et al.

(10) Patent No.: US 11,729,023 B2
(45) Date of Patent: Aug. 15, 2023

(54) ARTIFICIAL INTELLIGENCE INTEGRATION OF THIRD-PARTY SOFTWARE INTO LARGE-SCALE DIGITAL PLATFORMS

(71) Applicant: Bank of America Corporation, Charlotte, NC (US)

(72) Inventors: Montier Elliott, Charlotte, NC (US); Sergey E. Arakelov, Huntersville, NC (US); Brian Greig, Indian Trail, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 17/243,880

(22) Filed: Apr. 29, 2021

(65) Prior Publication Data
US 2022/0353109 A1  Nov. 3, 2022

(51) Int. Cl.
| | |
|---|---|
| *H04L 12/46* | (2006.01) |
| *G06N 20/00* | (2019.01) |
| *G06F 8/65* | (2018.01) |
| *G06F 8/60* | (2018.01) |
| *G06F 11/36* | (2006.01) |
| *H04L 67/146* | (2022.01) |
| *H04L 67/02* | (2022.01) |
| *H04L 67/00* | (2022.01) |
| *G06Q 20/08* | (2012.01) |
| *H04L 67/01* | (2022.01) |

(52) U.S. Cl.
CPC .............. *H04L 12/462* (2013.01); *G06F 8/60* (2013.01); *G06F 8/65* (2013.01); *G06F 11/3664* (2013.01); *G06F 11/3672* (2013.01); *G06F 11/3688* (2013.01); *G06N 20/00* (2019.01); *G06Q 20/0855* (2013.01); *H04L 67/01* (2022.05); *H04L 67/02* (2013.01); *H04L 67/146* (2013.01); *H04L 67/34* (2013.01)

(58) Field of Classification Search
CPC ....... H04L 12/462; H04L 67/01; H04L 67/02; H04L 67/146; H04L 67/34; H04L 67/568; G06F 8/60; G06F 8/65; G06F 11/3664; G06F 11/3672; G06F 11/3688; G06F 11/3006; G06F 2201/865; G06N 20/00; G06Q 20/0855
See application file for complete search history.

(56) References Cited

U.S. PATENT DOCUMENTS

| 7,823,166 B2 | 10/2010 | Wu |
| 9,307,052 B1 | 4/2016 | Alstad et al. |

(Continued)

*Primary Examiner* — Austin J Moreau
*Assistant Examiner* — Chhian (Amy) Ling
(74) *Attorney, Agent, or Firm* — Weiss & Arons LLP (57) ABSTRACT

Aspects of this disclosure relate to using artificial intelligence ("AI") to control integration of software developed by a third-party into an enterprise computing environment subject to more rigorous regulatory and security testing than typically provided by the third-party. AI software development automation tools will deploy third-party scripts to edge servers. Deploying to edge servers allows for integration of the third-party tags into testing environment pipelines. Local storage associated with third-party tags will be at a top-level domain, allowing third-party software tags to be treated as first party without the reputational and technical risks of cross-site storage.

15 Claims, 7 Drawing Sheets

(56) References Cited

U.S. PATENT DOCUMENTS

| | | | |
|---|---|---|---|
| 2013/0290480 A1* | 10/2013 | Manion | G06F 40/103 |
| | | | 709/217 |
| 2013/0297469 A1* | 11/2013 | Spittle | G06Q 10/10 |
| | | | 709/219 |
| 2016/0261699 A1* | 9/2016 | Martin | H04L 41/0246 |
| 2017/0364378 A1* | 12/2017 | Lipchuk | G06F 11/10 |
| 2018/0332327 A1* | 11/2018 | Helms | H04N 21/6334 |
| 2019/0014117 A1* | 1/2019 | Li | H04L 67/14 |
| 2019/0171620 A1* | 6/2019 | McCollum | G06F 21/62 |
| 2019/0327160 A1* | 10/2019 | Sivaprakasam | G06F 11/3672 |
| 2020/0125623 A1 | 4/2020 | Han et al. | |
| 2021/0117578 A1* | 4/2021 | Cheruvu | G06F 21/85 |
| 2021/0289048 A1* | 9/2021 | King | G06T 11/206 |

\* cited by examiner

ARTIFICIAL INTELLIGENCE INTEGRATION OF THIRD-PARTY SOFTWARE INTO LARGE-SCALE DIGITAL PLATFORMS

FIELD OF TECHNOLOGY

Aspects of this disclosure relate to using artificial intelligence to control integration of software developed by a third-party into an enterprise computing environment that is subject to more rigorous regulatory and security testing than typically provided by the third-party.

BACKGROUND

Large enterprise organizations may provide customers with access to content available over the internet or other insecure networks. Customers may access to the content by navigating to a webpage hosted by the enterprise organization.

The enterprise organization may leverage a number of different software solution from different vendors ("third-party software") to implement desired functionality within content provided to the customer. The third-party software may enhance customer experience and provide targeted content to the customer. However, the enterprise organization may be subject regulatory requirements that may not be followed by the vendors that supply the third-party software. The enterprise organization may hold itself to more rigorous levels of engineering practices than vendors that supply the third-party software.

Large enterprise organizations may provide thousands of publicly available webpages. Such large enterprise organizations may utilize many different third-party software applications to provide customers with relevant content and functionality when the customer accesses a webpage. Management of vendor provided third-party software is technologically complex. For example, the large number of webpages, large number of available third-party software applications and variety of customer devices that may be used to access a webpage give rise to complex enterprise environments. It is therefore technically challenging to manage deployment of third-party software in such complex enterprise environments.

Moreover, conventionally third-party software is maintained and hosted by the third-party on a third-party network. The enterprise organization may utilize a dedicated content delivery network ("CDN") to manage content associated with a webpage. The CDN may determine software that should be executed in response to a customer request for content. When the CDN determines that third-party software should be deployed, the CDN may issue and instruction to a third-party network to deploy the third-party software on a client access device ("client node").

This conventional approach for managing third-party software has several technological drawbacks. Firstly, browsers and browser extensions running on the client node may identify and block third-party software from executing on the client node or storing information on the client node. Secondly, the enterprise organization is ultimately accountable to the customer for poor performance of the third-party software. Hosting third-party software externally on third-party networks prevents the enterprise organization from logging performance of the third-party software, detecting errors in execution of the third-party software, and taking any proactive measures to improve performance of the third-party software. Thirdly, hosting third-party software on third-party networks prevents the enterprise organization from integrating third-party software into its rigorous development lifecycles and testing associated with development and deployment of a webpage hosted by the enterprise organization.

It would be desirable to provide a solution that overcomes the technological challenges of hosting and testing third-party software and utilizes efficiencies of utilizing software developed by third-party vendors. It would be desirable to provide a configuration and deployment solution for third-party software that allows enterprise organizations to integrate third-party software into development automation tools and version control systems deployed by the enterprise organization. It would be desirable to provide a solution that applies security and performance controls set by the enterprise organization for its internally developed software to vendor developed third-party software.

As described herein, ARTIFICIAL INTELLIGENCE INTEGRATION OF THIRD-PARTY SOFTWARE INTO LARGE-SCALE DIGITAL PLATFORMS provides technical solutions for integrating third-party software into software development automation tools and version control systems deployed by an enterprise organization.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Apparatus for a third-party software content delivery system is provided. "Third-party software" as used herein refers to software developed by an entity different from the entity that deploys the software on a client node. The system may include infrastructure for delivering third-party software to a client node. The system may be deployed on one or more edge servers. Using an edge server to deploy third-party software reduces latency of network responses to content requests received from the client node. Using an edge server to deploy third-party software may ensure that the third-party software provided to the client node has access to local storage on the client node and is recognized as first-party software by a browser on the client node.

The edge server may operate in a first domain. The first domain may be a secure, internal network operated by an enterprise organization. The enterprise organization may limit access to the first domain. For example, the first domain may not be accessible to a client node. Any software and hardware deployed on the first domain may be tested in one or more development environments. Pre-deployment testing in the development environments may ensure that software and hardware deployed on the first domain have achieved a threshold performance level and adhere to target version control guidelines set by the enterprise organization.

The edge server may respond directly to all content requests received from the client node. Direct responses from the edge server may avoid any cross-domain content requests. Cross-domain content requests, if allowed, may compromise integrity of the client node. Cross-domain requests, if allowed, may compromise integrity of other nodes connected to the first domain.

The system may provide a specialized application program interface ("API") for implementing any proprietary logic required for execution of the third-party software deployed by the edge server. The specialized API may be configured to implement asynchronous JavaScript methods called by the third-party software through a module standardized for use on the first domain. The standardized module may be tested to ensure that it complies with security and regulatory requirements on the first domain.

The system may include a client node. The client node may be any suitable computing systems such as personal computers, server computers, handheld or laptop devices, tablets, "smart" devices, mobile phones, multiprocessor systems, minicomputer systems, microprocessor systems, mainframe computers, distributed computing environments that include any of the above systems or devices, and the like.

The client node may submit a request for digital content. For example, the client node may submit a request for content associated with a webpage, such as www.bofa.com. The digital content associated with the desired webpage may be hosted on the first domain. For example, the system may include an edge server on the first domain. An edge server is a computer system that is positioned at a logical edge of a domain or network. The edge server may provide a connection between a first domain and a second domain.

A client node may operate in a second domain. The second domain may be an internet zone or another open or unsecure network. An edge server may be configured to ingest a content request received from the client node. The edge server may provide a point of entry for a client node to access content stored on the first domain. Content stored by the edge server may include a set of tags. The set of tags may be hosted by any suitable node on the first domain.

A "tag" may be software that includes executable computer code. A tag may be included or embedded in content provided to the client node in connection with accessing a webpage. For example, a tag may be a snippet of Java code. After being transferred to the client node, a tag may execute on the client node. A tag may not be visible to an end user of the client node. Execution of a tag on the client node may require communication between the client node and another node. The other node may be on the second (e.g., internet) domain. The other node may be on a third domain.

A tag may be a cookie. A cookie includes computer code that captures and logs data on the client node. Cookies typically store captured data within the web browser running on the client node. A tag may be a pixel. A pixel includes computer code that is embedded in other content provided to the web browser running on the client node. A tag may be used to activate a cookie.

A tag may be third-party software (e.g., a third-party tag). A tag may be created by a vendor that monitors actions of a client node in response to presented webpage content. The vendor may be a third-party relative to the owner of the webpage or owner of a domain on which the webpage is hosted. For example, the vendor may be commissioned by a webpage owner to monitor consumption of webpage content. The tag may run on a client node and capture data generated by the client node when viewing webpage content. A creator of the tag (e.g., third-party vendor) and/or the webpage owner may attempt to decipher logical conclusions based on the captured data.

A third-party tag may be embedded into source code that defines content of a webpage. Conventionally, a third-party tag may allow computer systems on a remote (e.g., second) domain, to communicate with the tag and receive information captured in connection with customer interaction with webpage content presented on a client node. A third-party tag running on a client node may be used to trigger webpage functionality such as a live chat function. The third-party tag may be utilized to analyze performance of a webpage content presented on a client node. The third-party tag may be utilized to trigger display of webpage content customized specifically for a client node.

An edge server may transfer the at least one third-party tag to the client node. An edge server on a first domain may receive a third-party communication request from a third-party tag running on the client node. The third-party communication request may be addressed to a node on a second domain. The edge server may fulfill the third-party communication request received from the third-party tag by creating a communication bridge from the client node to the second domain via the edge server.

Creating the communication bridge may include, at the edge server, repackaging the third-party communication request generated by the third-party tag into a communication request that appears to have originated on the first domain (e.g., a "first-party" communication request). A first-party communication request may conform to protocols operative on the first domain. Such protocols may include use of software or hardware vetted for use on the first domain.

Using the protocols operative on the first domain, the edge server may transmit the first-party communication request (repackaged third-party request) from the edge server to the second domain. The first-party communication request may communicate with the second domain using security and communication protocols that are operative on the first domain. The security and communication protocols operative on the first domain may be more rigorous than the protocols operative on the second domain.

Transferring a third-party tag to a client node may include configuring the edge server to transfer one or more third-party tags associated with content requested by the client node. The edge server may be configured to extract the third-party tags from a storage location on the first domain. The edge server may determine which third-party tags to load on a client node. The edge server may utilize a content delivery network ("CDN") to determine which third-party tags to load on a client node.

The edge server may transfer a request for digital content received from the client node to a CDN. The CDN may be external to the first domain. The CDN may instruct the edge server to deliver the at least one third-party tag to a client node. The CDN may monitor and coordinate deployment of first and third-party tags (e.g., tag governance) by the edge server.

A web browser may be configured to block third-party tags received by a client node. For example, the browser may be configured to block tags received from any domain other than the domain hosting content requested by the client node. If the client node requests content from www.bofa.com, the browser may block tags received from www.bofa1.com. Therefore, if a CDN attempts to directly transfer a third-party tag to the client node, the tag may be blocked by the browser on the client node. The third-party tag may be blocked because the CDN is not hosted on the same domain as the webpage content requested by the client node.

However, when a third-party tag is provided to the client node by the edge server, the third-party tag is provided by the same source domain as webpage content provided to the client node. The browser on the client node will therefore accept all third-party tags provided by the edge server. The browser will accept all third-party tags even if the edge server is sourcing the third-party tags from a remote host.

From a perspective of the browser on the client node, all tags provided by the edge server will be viewed as first-party tags. Using the communication bridge, the client node is limited to conducting communication with the edge server. Such a communication limitation ensures that all content provided by the edge server to the client node will be accepted by the client node.

However, even though third-party software such as a third-party tag may be provided by the first-party edge server, the third-party tag may be programmed to initiate communication with an external domain. To maintain this functionality, the edge server may utilize a first API to receive any such communication requests initiated by the third-party tag. The edge server may transfer third-party communication requests from the edge server to the second domain using a second API. Using the communication bridge and the associated second API, the edge server may process any functional calls initiated by third-party tags loaded on the client node. The edge server may be configured to utilize the second API to facilitate communication between the third-party tag running on the client node and a remote domain, independently of other communication between the edge server and client node.

The second domain may transfer a response to a third-party communication request from the second domain to the edge server. The second domain may utilize the second API to communication with the edge server. The second domain may utilize a third API to communication with the edge server. The edge server may convert any communication received using the third API into the second API. The second API may be utilized for communication between the edge server and other nodes on the first domain. The second API may be configured for secure communication between the nodes on the first domain. The edge server may communication responses to the third-party communication to the client node using the first API.

The content delivery system may include a testing environment. A third-party tag may only be run on a client node after the third-party tag has been evaluated by the testing environment. The third-party tag may only be loaded on a client node if the testing environment has determined the third-party tag meets a threshold level of performance associated with the first domain. Illustrative performance levels may include verifying that the third-party tag does not resist role-based authentication, separation of duties, code ownership rules and version control guidelines enforced on the first domain.

The edge server may log performance of the third-party tag executing on the client node. The edge server may determine whether the execution of the third-party tag on the client node meets the threshold performance level. The edge server may log communication of the third-party a domain outside the first domain.

A federated tag manager system is provided. The system may include an edge server. The edge server may operate in a first domain. The first domain may be a secure domain, that, aside from communication with the edge server, is not accessible from an internet zone. The edge server may control access to content hosted on the first domain. The system may include a client node that operates in a second domain. The second domain may be the unsecure internet zone.

The client node may request content hosted on the first domain. The content request initiated by the client node may be forwarded to the edge server. The edge server may act as a buffer between the client node operating in the internet zone and the content hosted on the first domain.

The system may include an artificial intelligence ("AI") content controller. The AI content controller may operate in the first domain. The AI content controller may be run on the edge server. The AI content controller may include machine executable instructions, that when executed by a processor on a computer system, controls a transfer of webpage content hosted on the first domain.

The AI content controller may transfer first-party content to the client node. First-party content may include webpage content that is responsive to the content request received from the client node. Exemplary first-party content may include text, audio, video, pictures and programmed functionality associated with a webpage. Programmed functionality may include an ability to login to a secure portal, enter queries, search of information and receive search results.

First-party content may be written by an entity that owns the domain where a webpage accessed by the client node is hosted. First-party content may be stored and available on the first domain. The AI content controller may determine third-party content for loading on the client node. Third-party content may include third-party tags, software or other content that is not visible on the client node.

For example, third-party content may include computer code that monitors interaction of the client node with first-party content. The third-party content may determine whether to load additional functionality or content based on the detected interaction of the client node with the first party content.

Conventionally, the third-party content is loaded onto the client node from a location that is remote from a webpage accessed by the client node. Third-party content is typically developed independently of first-party content. For example, the same third-party content may be utilized regardless of the specific webpage accessed by a client node. The same third-party content may be utilized regardless of the specific first-party content provided to the client node.

Conventionally, third-party content is also and hosted remotely from first-party content. For example, the third-party content may be hosted on the internet zone by the independent developer of the third-party content. However, remote hosting of third-party content prevents the third-party content from being subject to internal software controls associated with the first domain. Furthermore, remote hosting of third-party may cause a browser on the client node to reject any such third-party content.

The AI content controller may be configured to extract third-party content stored in a repository on the first domain. The AI content controller may load the third-party content onto the client node using the same communication channel used for loading first-party content onto the client node. The AI content controller may monitor execution of the third-party content on the client node. The AI content controller may decommission any third-party content that fails to meet a threshold performance level when executing on the client node.

The AI content controller may further be configured to identify relevant third-party content in response to a request to access a webpage received from a client node. In some embodiments, the AI content controller may identify relevant third-party content based on submitting a request received from the client node to a content delivery network ("CDN"). The CDN may hosted outside the first domain where the AI content controller is hosted. The CDN may correlate first-party content requested by the client node with complementary third-party content. The AI content controller may receive, from the CDN, a listing of third-party content that is associated with the content request received from the client node. The AI content controller may extract the relevant third-party identified by the CDN from a repository on the first domain.

In some embodiments, the AI content controller may be configured to directly identify first-party content in response to a content request received from the client node. The AI content controller may directly, without communicating with a CDN, formulate a listing of third-party content that is associated with content requested by the client node.

The AI content controller may extract relevant third-party content from a repository on the first domain. The AI content controller may provide the client node with third-party content that is sourced from the same domain as first-party content provided to the client node. Sourcing the first and third-party content from the same domain mitigates a risk that a browser on the client node will block the third-party content.

Sourcing the first and third-party content from the same domain also reduces latency when delivering content to a client node. Conventionally, third-party content would be transferred to the client node from a remote location, injecting latency into the content delivery process. Sourcing first and third-party content from the same domain limits points of failure and allows controls to be deployed on the first domain for mitigating the impact of any detected operational failure of third-party content.

The AI content controller may further be configured to transpile third-party content stored on the first domain. Transpiling third-party content may convert the third-party content into a format authorized for use on the first domain. Transpiling the third-party content may convert the third-party code from a native format into a secure format authorized for use on the first domain. A third-party software developer may write the third-party content in the native format.

Third-party content may be transpiled into a format that is utilized by software development automation tools and version control systems deployed on the first domain. After the third-party content has been transpiled into the authorized format, the AI content controller may utilize the automation tools and control systems on the first domain to enforce role-based authentication, separation of duties and code ownership rules on the first domain. The AI content controller may also utilize a target API for allowing transpiled third-party content to interact with a remote domain using communication protocols compatible with the underlying native format of the third-party content.

The AI content controller may further be configured to load third-party content onto the client node in response to a first content request received from the client node. The AI content controller may cache the third-party content on the client node. The AI content controller may receive a second content request from the client node. In response to the second content request, the AI content controller may utilize the cached third-party content to load third-party content associated with the second content request.

The AI content controller may further be configured to push transpiled third-party content into a testing environment. The AI content controller may confirm that the third-party content, when operating in the testing environment, performs at a target level. The target performance level may be defined by verifying that third-party content, such as a tag or other software, does not resist role-based authentication, separation of duties, code ownership rules and version control guidelines enforced on the first domain.

Pushing transpiled third-party content into the testing environment may evaluate functionality the third-party content and identify incompatibility or errors associated with the third-party content. Conventionally, it is complex to test third-party content that does not reside on the same domain as the first-party content. It is also complex to test third-party content in its native format Obfuscated third-party content may be modularized to allow it to be transpiled and tested without exposing the underlying code.

Third-party content is typically configured to use an "open" API configured for communication with remote networks, or other content hosted by a third-party software developer. However, those open APIs typically do not conform to security protocols on the first domain. Those open APIs typically have not been tested internally by the enterprise organization responsible for the first-party content provided when a client node accesses a webpage.

To solve these technical challenges, systems disclosed herein transpile the third-party content into a format that conforms to security and operation protocols in effect on the first domain. The transpiled third-party content may also be capable of being tested internally by the enterprise organization using development environments utilized to test first-party content. The system may also provide a customized API for transpiled third-party content to interact with the open API in conformance with security and operational protocols in place on the first domain. The AI content controller may control interaction of the transpiled third-party code with other systems on the first domain.

The customized API may ensure that any system calls originating from transpiled third-party content are safe to be processed on the first domain and its associated nodes. The custom API may map open API systems calls generated by third-party content into a standard that is acceptable for operation on the first domain. The AI content controller may generate parameters requested by transpiled third-party content in a format required by the native format third-party content or a remote domain.

Third-party content may be a first instance of third-party content. The AI content controller may be configured to push the first instance of third-party content and a second instance of third-party content into the testing environment. The AI content controller may confirm that first and second instances of third-party content are compatible with each other when they are both run on a client node. For example, the testing environment may confirm that when the first and second instances of third-party content are concurrently executed on the client node, they will each operate at a target performance level.

An artificial intelligence method for integrating third-party software into an enterprise digital content platform is provided. Methods may include transpiling executable computer code written in a native format into a format authorized for use on a first domain. The format authorized for use on the first domain may be compatible with software development automation tools and version control systems in operation on the first domain. Methods may include pushing the transpiled computer code into a testing environment. Methods may include applying a testing regime to the transpiled computer code.

Methods may include, when the transpiled computer code achieves a threshold performance level in response to application of the testing regime, storing the transpiled computer code in a repository on an edge server of the first domain. Methods may include receiving a content request from a client node operating in an internet zone or other unsecure domain. The internet zone may be a relatively unsecure domain relative to the first domain.

Methods may include passing the content request to the edge server. Methods may include, at the edge server, determining that the transpiled computer code should be executed on the client node in response to the content request. The AI content controller may make such a determination based on first-party content that has or will be provided to the client node in response to the content request.

Methods may include configuring parameters for execution of the transpiled computer code on the client node. The AI content controller may configure the parameters based on communication with a remote domain. Communication with the remote domain may utilize a custom. API that allows the transpiled third-party content to communicate with a remote domain via the edge server.

The AI content controller may configure any parameters for transpiled third-party content based on communication with the remote domain using the custom API. Illustrative parameters may include outgoing data captured by the third-party content on the client node and destined for the remote domain. Illustrative parameters may include incoming data received from a remote domain and destined for the third-party content on the client node. Configuring parameters may include formatting data captured by the third-party content into a format that is expected by the remote domain. Configuring parameters may include formatting data received from the remote domain into a format that is expected by the first domain.

Methods may include pushing transpiled third-party content and associated parameters from the edge server to the client node. Methods may include monitoring execution of the transpiled third-party content on the client node. Methods may include removing the transpiled third-party content from the repository in response to detecting that execution of the transpiled third-party content on the client node fails to meet a threshold performance level.

Methods may include deploying a first API. The first API may allow the transpiled third-party content to interact with one or more nodes on the first domain. The first API may comply with security and regulatory requirements associated with the first domain. Methods may include deploying a second API. The second API may allow the transpiled third-party content to interact with nodes on the internet zone or other remote domain. The second API may allow the transpiled third-party content to interact with nodes on the internet zone via the first domain.

For example, the AI content controller may receive requests from the transpiled third-party content using the first API. The requests may include information destined for a remote domain. The requests may ask a remote domain to provide information to the client node. The AI content controller may covert the requests received from the transpiled third-party content into an appropriate format for the second API. Using the second API, the AI content controller may transmit the converted requests to the remote domain.

Methods may include removing transpiled third-party content from a repository on the first domain. For example, the AI content controller may remove the transpiled content in response to detecting availability of an updated version of the third-party content written in the native format. The AI content controller may detect availability of the updated version using the second API to communicate with the remote domain.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

Figure 1:
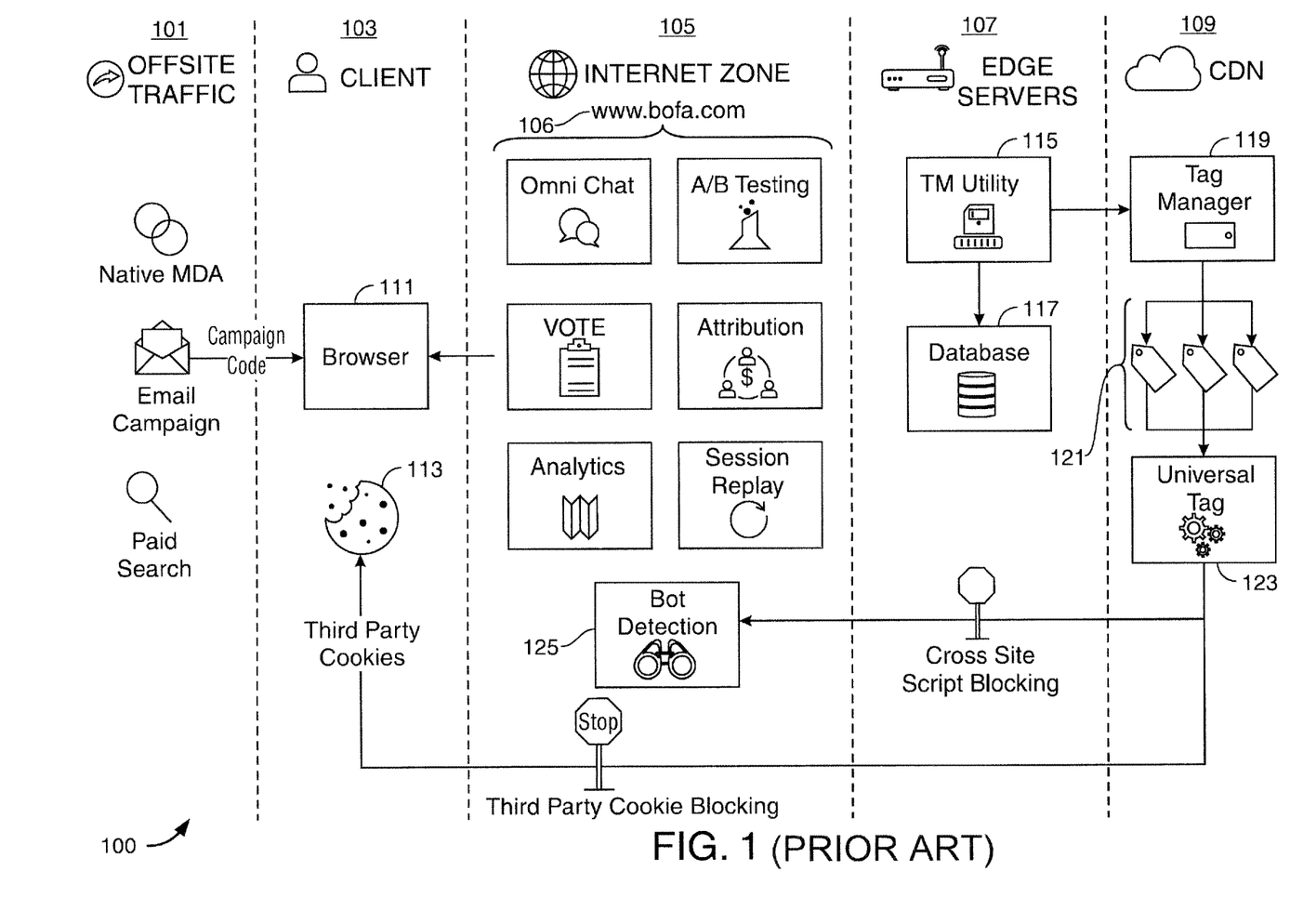
FIG. 1 shows a prior-art process flow.

FIG. 1 shows illustrative prior art process flow 100. Flow 100 includes content 101. Content 101 may be provided to client node 103. Client node 103 may open or view content 101 in browser 111 running on client node 103. Content 101 may direct client node 103 to webpage 106 on internet zone 105. Webpage 106 may provide access to additional content and services.

Content and services associated with webpage 106 and provided to client node 103 may be controlled by edge server 107. Edge server 107 may receive requests to access content on webpage 106 from client node 103. Edge server 107 may utilize tag manager utility 115 to determine content that will be made available to client node 103.

For example, tag manager utility 115 may determine whether client node 103 has previously submitted a content request to edge server 107 to access webpage 106. Information stored in browser 111, such as cookie data, may be compared to records stored in database 117. Based on the comparison, edge server 107 may determine whether client node 103 has previously submitted a content request to edge server 107 to access webpage 106.

When determining content that will be provided to client node 103, tag manager utility 115 may rely on output provided by tag manager 119. Conventionally, tag manager 119 is hosted on a CDN that is remote from edge server 107. For a content request received from client node 103, tag manager 119 may formulate or identify universal tag 123 that will define content loaded on client node 103. Universal tag 123 may include instructions for loading a set of tags 121 that enhance content that will be provided to client node 103.

Tags 121 may include code that is susceptible to being blocked by browser 111. For example, FIG. 1 shows that tags corresponding to bot detection 125 and third-party cookies 113 may be blocked by browser 111 on client node 103.

Figure 2:
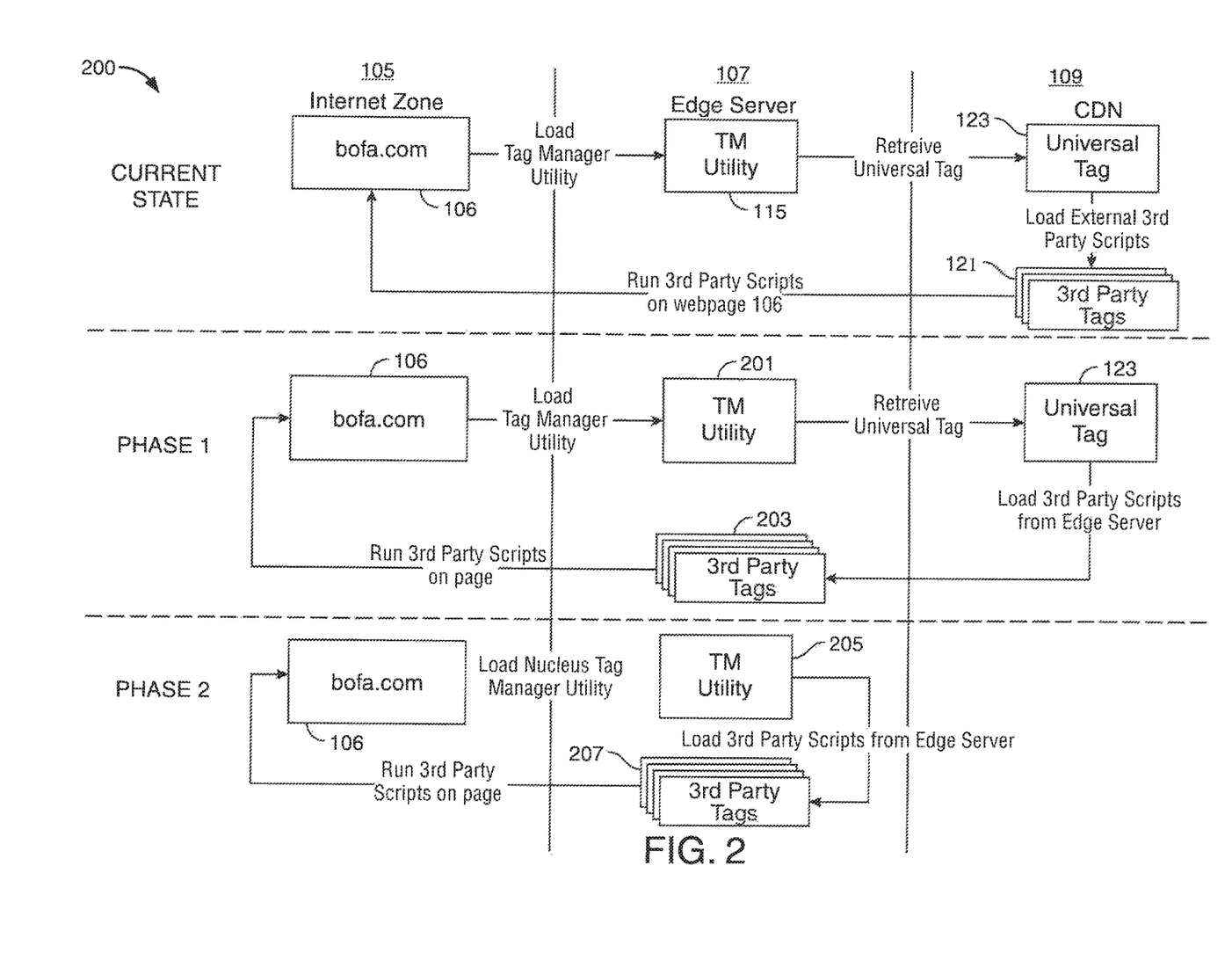
FIG. 2 shows illustrative systems and process flows in accordance with principles of the disclosure.

FIG. 2 shows illustrative systems and processes 200 that improve the process flow 100 (shown above in FIG. 1) for delivering content associated with webpage 106 to client node 103.

In FIG. 2, the "current state" shows that, as depicted above in FIG. 1, client node 103 may request content associated with webpage 106 hosted on internet zone 105. The content request initiated by client node 103 may trigger operation of tag manager utility 115. Tag manager utility 115 may in turn communicate with CDN 109 and retrieve universal tag 123 which defines content associated with webpage 106 that will be loaded onto client node 103. Universal tag 123 may in turn trigger loading of third-party tags 121 on client node 103.

The current state shows that edge server 107 does not host third-party tags 121 locally and relies on CDN 109 to provide and load third-party tags 121 onto client node 103. As shown in FIG. 1, browser 111 may block third-party tags 121. Additionally, because third-party tags 121 are hosted by CDN 109, third-party tags 121 are not tested for compliance with security protocols or performance standards implemented by the enterprise organization that created webpage 106.

"Phase 1" shown in FIG. 2 shows that third-party tags 203 are now provided to client node 103 directly from edge server 107. In Phase 1, CDN 109 still determines which tags should be loaded onto client node 103. However, in Phase 1, CDN 109 does not load third-party tags 203 onto client node 103. In Phase 1, CDN 109 may determine which third-party tags 203 should be loaded on client node 103. However, edge server 107 hosts and loads third-party tags 203 onto client node 103.

Utilizing edge server 107 to load third-party tags 203 advantageously prevents browser 111 from blocking third-party tags 203. Edge server 107 is a node on the same domain as webpage 106. In some embodiments, edge server 107 also hosts first-party content associated with webpage 106. Therefore, content provided by edge server 107 will appear to browser 111 as being sourced directly from the domain hosting webpage 106.

In Phase 1, although edge server 107 is providing third-party tags 203 to client node 103, third-party tags 203 are still identified and hosted by CDN 109. Third-party tags 203 are therefore unable to be tested for compliance with security protocols and performance together with first-party content associated with webpage 106.

"Phase 2" shows that edge server 107 does not rely on CDN 109 to determine which third-party tags 207 to load in connection with access to webpage 106 by client node 103. In Phase 2, third-party tags 207 are loaded onto client node 103 together with first-party content associated with webpage 106. In Phase 2, edge server 107 includes tag manager utility 205. Tag manager utility 205 may include an AI content controller.

Tag manager utility 205 may transpile third-party tags. In Phase 2, edge server 107 controls deployment of transpiled third-party tags 207. For example, third-party tags 207 may be transpiled into a format that is compatible with quality assurance applications and testing environments accessible via edge server 107 on a first domain. Edge server 107 may apply a testing regime to the transpiled third-party tags 207 before third-party tags 207 are loaded onto client node 103.

In Phase 2, edge server 107 may control caching of third-party tags 207 on client node 103. Edge server 107 may also log performance of transpiled third-party tags 207. Based on the testing and/or logging, edge server 107 may detect that one or more of third-party tags 207 do not meet threshold testing or performance levels. Edge server 107 may decommission any of third-party tags 207 that do not meet threshold testing or performance levels.

Figure 3:
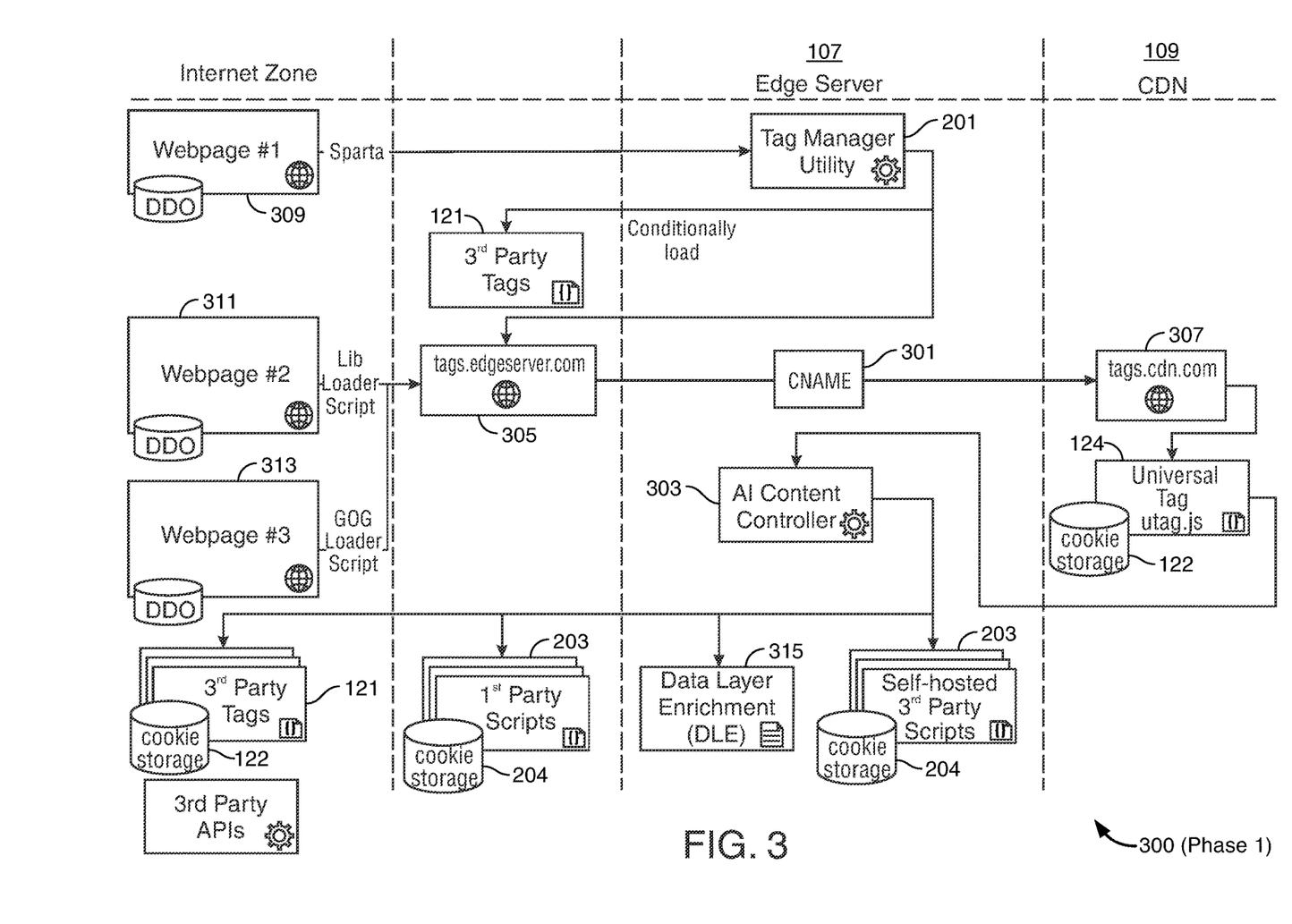
FIG. 3 shows illustrative systems and process flows in accordance with principles of the disclosure.

FIG. 3 shows additional detail on systems and processes deployed in connection with Phase 1 shown above in FIG. 2. Phase 1 leverages tag manager utility 201 make two changes in the way third-party tags are loaded on client node 103 when accessing webpage 106.

First, FIG. 3 shows that in Phase 1, canonical name ("CNAME") 301 creates an alias from first domain (e.g., tags.edgeserver.com) to second domain 307 (e.g., tags.cdn-.com). Second domain 307 may host CDN 109. In Phase 1, CDN 109 may determine third-party software (e.g., tags) that should be executed in response to a customer request for content associated with webpages 106, 309, 311 and/or 313. CDN 109 may utilize configuration file 124 (e.g., utag.js) to determine third-party tags 121 to associate with a content request.

CDN 109 provides third-party tags 121 to AI content controller 303. AI content controller 303 forwards third-party tags 121 to client node 103. Third-party tags 121 forwarded by AI content controller 303 are registered by browser 111 as originating from a first domain 305 in connection with access to webpages 106, 309, 311 and/or 313.

When third-party tags 121 and cookies 122 are loaded into browser 111 by AI content controller 303, they are not rejected when browser 111 is configured to block third-party software. Loading third-party tags 121 into browser 111 from AI content controller 303 running on edge server 107 also prevents third-party tags 121 from being blocked by services that may have otherwise prevented third-party scripts 121 from operating on client node 103 had they originated from CDN 109.

As shown in FIG. 3, in Phase 1, third-party tags 121 are not loaded onto client node 103 by CDN 109. Instead, third-party tags 121 are loaded onto client node 103 directly by AI content controller 303 running on edge server 107. By loading third-party tags 121 directly from edge server 107, third-party tags 121 will be run as first-party scripts 203 on client node 103. Running third-party tags 121 as first-party scripts 203 prevents cross-domain script blocking by browser 111 on client node 103.

Figure 4:
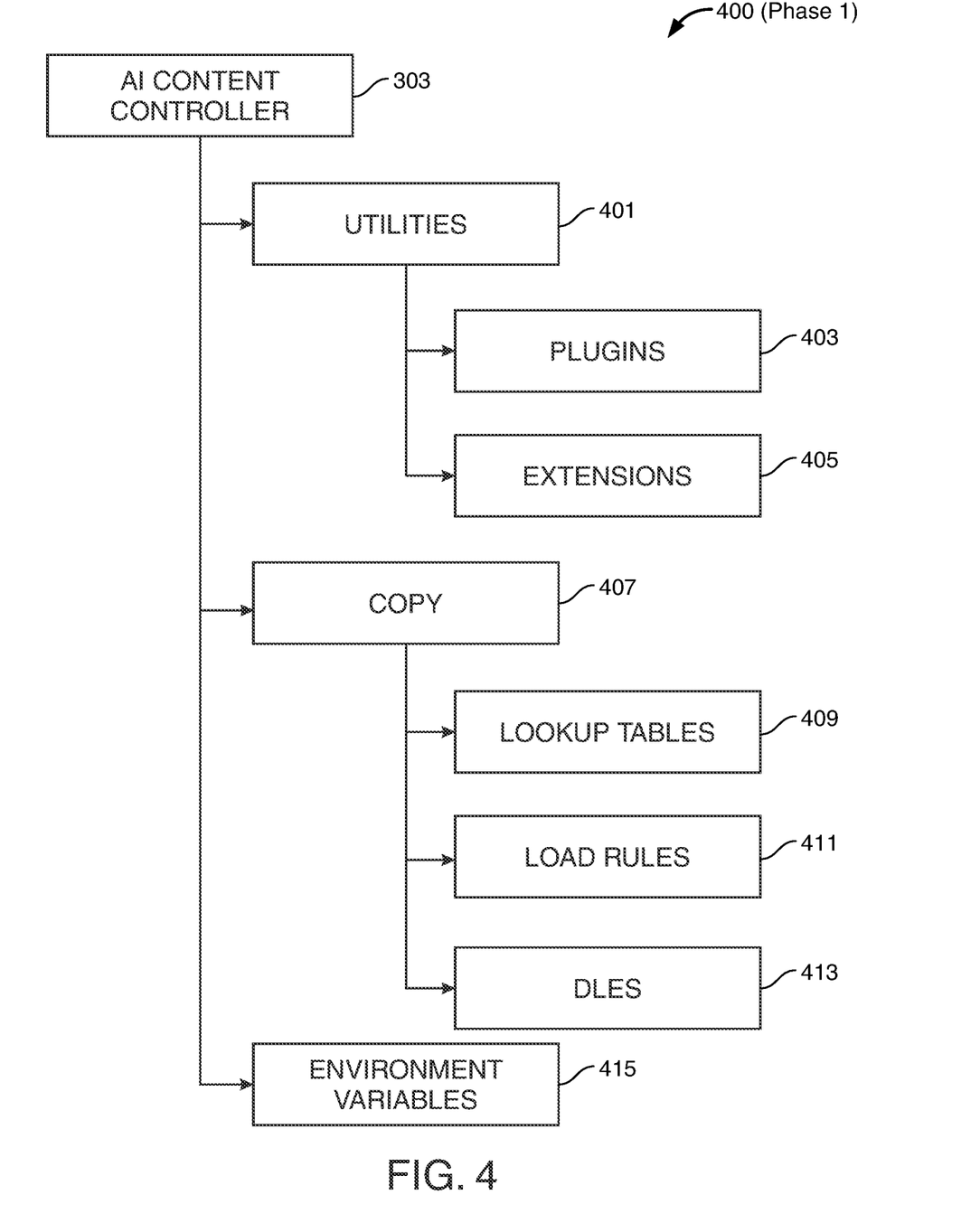
FIG. 4 shows illustrative systems and process flows in accordance with principles of the disclosure.

In Phase 1, AI content controller 303 may include illustrative directory structure 400 shown in FIG. 4. Directory structure 400 includes utilities 401. Utilities 401 may include third-party software such as plugins 403 and extensions 405. Utilities 401 may include third-party software that may be run on client node 103 in connection with display of webpage 106. Directory structure 400 includes copy 407. Copy 407 includes lookup tables 409, load rules 411 and data layer enrichment 413.

Directory structure 400 includes environmental variables 415. Environmental variables 415 may include parameters that are passed to utilities 401. Environmental variables 415 may configure one or more of utilities 401 for operation on specific device or network. For example, environmental variables 415 may indicate that client node 103 is a mobile device and that utilities 401 should be configured appropriately for operation on a mobile device. Environmental variables 415 may indicate that client node 103 is operating in a network with limited bandwidth and that utilities 401 should be configured appropriately for operation on such a network.

Figure 5:
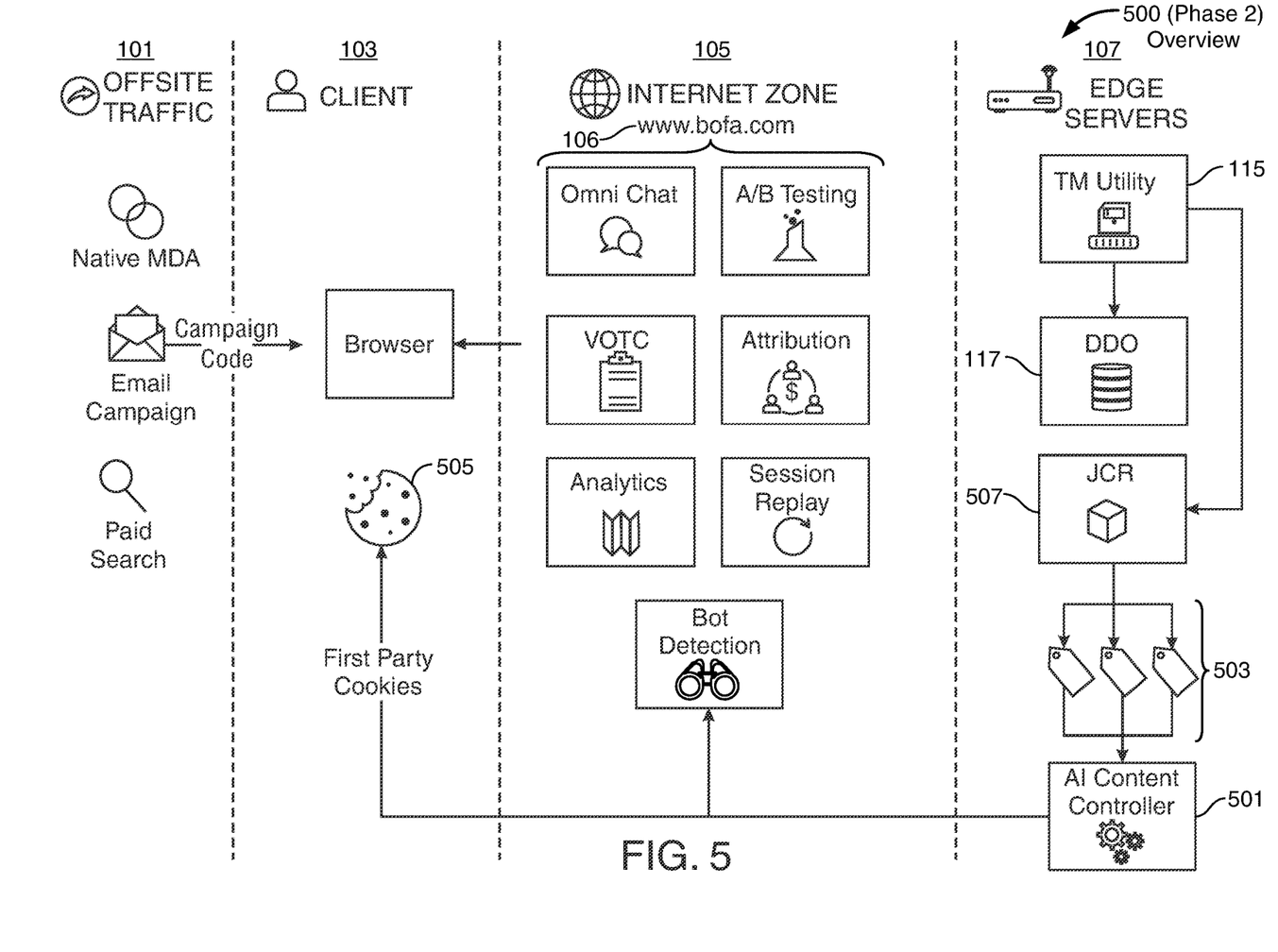
FIG. 5 shows an illustrative system and associated components in accordance with principles of the disclosure.

FIG. 5 shows additional detail on systems and processes deployed in connection with 500 (Phase 2), shown above in FIG. 2. In Phase 2, edge server 107 runs all services needed to determine and load third-party tags 503 on client node 103 in response to a request for content associated with webpage 106.

In Phase 2, AI content controller 501 is hosted on edge server 107. AI content controller 501 may generate a universal tag (not shown) that is passed to tag manager utility 115. The universal tag may list individual tags (first and third-party) that AI content controller 501 has determined should be loaded on client node 103 to display content associated with webpage 106 in response to a request received from client node 103. Configuration changes to the universal tag may be managed through a hosted data layer enrichment 315 (shown in FIG. 3). Data enrichment layer 315 may include Java Content Repository ("JCR") files 507, which are also locally accessible to edge server 107. JCR files 507 specify where to access third-party tags (or other content) within a database. Third-party tags 503 identified in the universal tag may be loaded by AI content controller 501 as first-party tags and first-party cookies 505.

The Phase 2 system shown in FIGS. 2 and 5 reduces latency from a time client node 103 requests content associated with webpage 106 and a time the content is displayed on client node 103. Using edge server 107 and its associated AI content controller 501 there are fewer points of failure because access to CDN 109 on a remote domain is no longer needed.

Furthermore, in the Phase 2 system, edge server 107 and third-party tags 503 are both hosted on a first domain operated by the enterprise organization responsible for the content of webpage 106. By moving the content and the delivery programming onto a single domain, the enterprise organization now has control over the entire content provisioning process via edge server 107. Edge server 107 may apply testing regimes to the content provisioning process, analyze points of failure and deploy controls to remediate any detected failure points.

Figure 6:
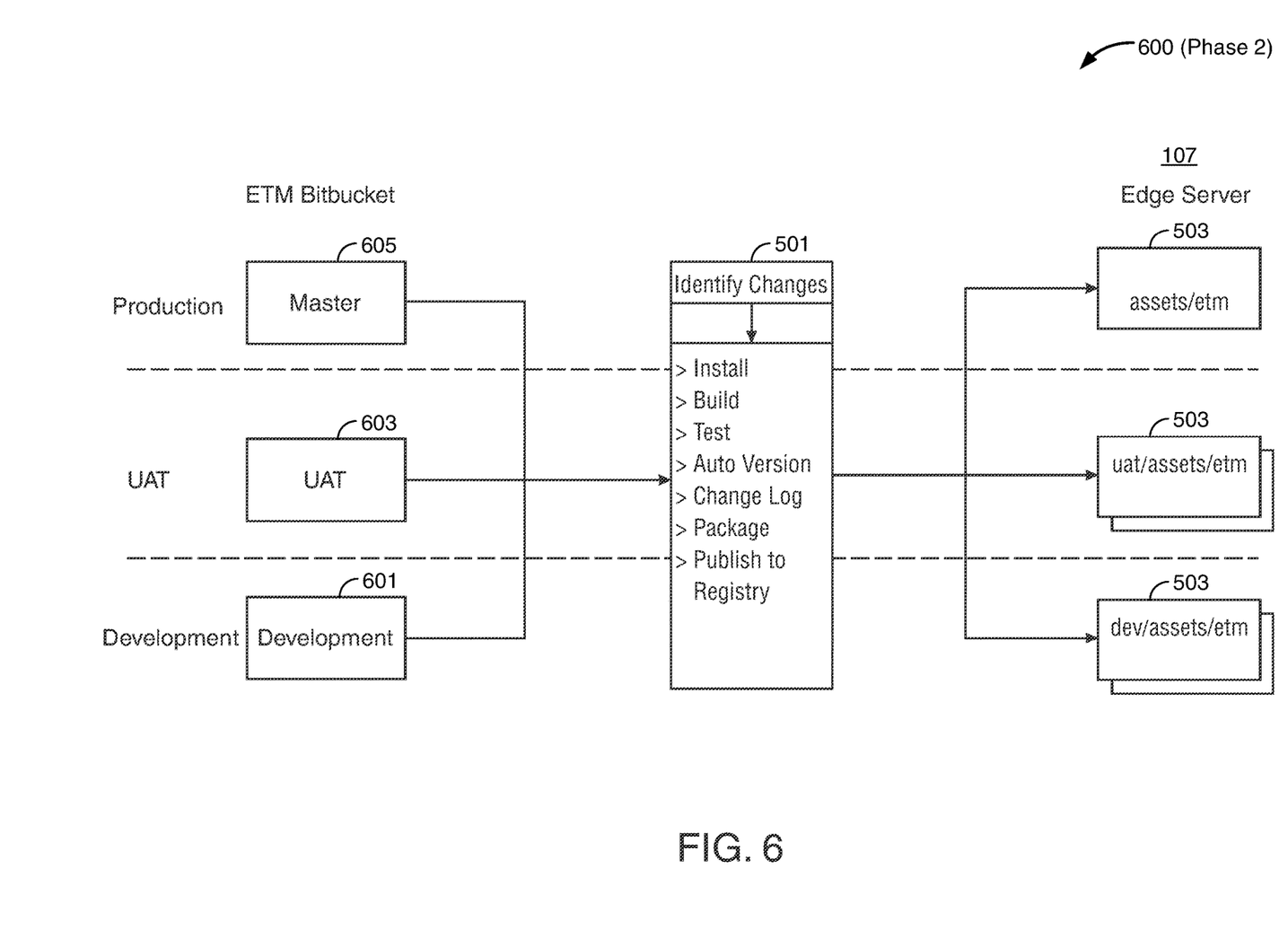
FIG. 6 shows illustrative systems and process flows in accordance with principles of the disclosure.

FIG. 6 shows illustrative release process 600 for deploying a Phase 2 system in connection with enterprise tag management ("ETM"), as shown above in FIGS. 2 and 5. Process 600 shows that a Phase 2 system may be subject to rigorous pre-deployment testing. Such testing would not have been possible under the current state or Phase 1 systems shown in FIG. 2. Such testing is only available in the Phase 2 system where edge server 107 locally hosts third-party tags 503 and edge server 107 is responsible for delivering third-party tags 503 to client node 103.

Pre-deployment testing may include integrating AI content controller 501 into software development automation tools and version control systems. Pre-deployment testing may include confirming that AI content controller 501 adheres to internal controls for enforcing role-based authentication, separation of duties and code ownership.

The AI content controller 501 may utilize one or more machine learning algorithms to determine content that will be transferred to a requesting client node. Illustrative machine learning algorithms may include AdaBoost, Naive Bayes, Support Vector Machine, Random Forests, Artificial Neural Networks and Convolutional Neural Networks.

In Phase 2 system 600, third-party tags 503 are transpiled using a package manager. The package manager may be included in AI content controller 501. Transpiled third-party tags 503 may be stored in a repository that is available across all customer-facing digital assets (e.g., webpage 106) serviced by edge server 107. Each webpage whose content is serviced by edge server 107 will load third-party tags 503 based on a universal tag (e.g., JCR object 507) that identifies for each webpage which tags should be loaded and how each tag should be configured for a client node that requests access to a webpage.

Managing deployment of third-party tags 503 using edge server 107 provides access to internal logs that track performance of third-party tags 503. Deploying third-party tags 503 using edge server 107 also integrates third-party tags 503 into lower-level environment pipelines, unit testing, and adherence to version control guidelines. Illustrative lower-level environments include development environment 601, user acceptance testing ("UAT") environment 603 and production environment 605.

Using a Phase 2 system architecture, third-party tags 503 provided by edge server 107 may be loaded onto client node 103 less frequently than in conventional content delivery systems. Edge server 107 may trigger caching of third-party tags 503 on client node 103. After being cached, client node 103 may leverage cached third-party tags 503 when accessing any webpage hosted by an enterprise organization's digital platform. Cookies and local storage for third-party tags 503 will be at a top-level domain level, allowing third-party tags 503 to be viewed as first party tags by browser 111 on client node 103.

Deploying third-party tags 503 using edge server 107 allows an enterprise organization to utilize a standardized build processes to onboard third-party software vendors quickly. The standardized build process provides a conformed application programming interface and configuration files. Integrating third-party tags 503 into a large-scale digital platform includes a modular design that permits new third-party software to be added, removed, and changed as needed. The Phase 2 system design shown in FIGS. 2, 5 and 6 provides for central management of third-party software integrations by utilizing AI content controller 501 to provide centralized management and propagate updates across all systems.

Phase 2 backend systems and frameworks do not need to be based on the identical technology as long as a web presentation layer is used (HTML, CSS, and JavaScript) on client node 103. The web presentation layer allows browser 111 to execute third-party scripts at runtime. Specific requirements for each webpage as to which third-party software to include in response to a request for webpage content should be controlled by a conformed data structure (such as JCR file 507) containing conditional arguments which define requirements for integration of each desired third-party tag 503. The build and deployment process for a Phase 2 system integrates with industry standard software development automation tools and version control systems that may already be deployed on edge server 107 or the domain hosting edge server 107.

Conventionally, infrastructure for deployment of client-driven, third-party software is dependent on a CDN accessible across all domains that host webpage content. In the Phase 2 system design, edge server 107 directly supplies content for one or more of webpages 106, 309, 311, or 313. Using edge server 107 to directly supply webpage content reduces latency of network content requests, ensures third-party tags 503 have access to local storage and can trigger first-party cookies. In the Phase 2 system design, all third-party tags 503 are deployed by edge server 107, ensuring there are no cross-domain requests when providing webpage content. If any of third-party tags 503 require execution of proprietary logic, such execution may be accessed via API requests by way of asynchronous JavaScript methods through a standardized module.

Edge server 107 and other computer systems disclosed herein may include a processor circuit. The processor circuit may control overall operation of a computer server. A processor circuit may include hardware, such as one or more integrated circuits that form a chipset. The hardware may include digital or analog logic circuitry configured to perform any suitable (e.g., logical) operation.

Computer systems and servers may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Computer systems and servers may include RAM, ROM, an input/output ("I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the computer systems and servers may be stored within the non-transitory memory and/or other storage medium. Software applications may provide instructions to the processor that enable the computing system to perform various functions. For example, the non-transitory memory may store software applications such as AI content controller, an operating system, third-party tags, machine learning algorithms and an associated database. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

A computer system and server may be part of two or more networks. A computing system may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, a computer system and server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards. In some embodiments, the components may be integrated into a single chip. The chip may be silicon-based.

Figure 7:
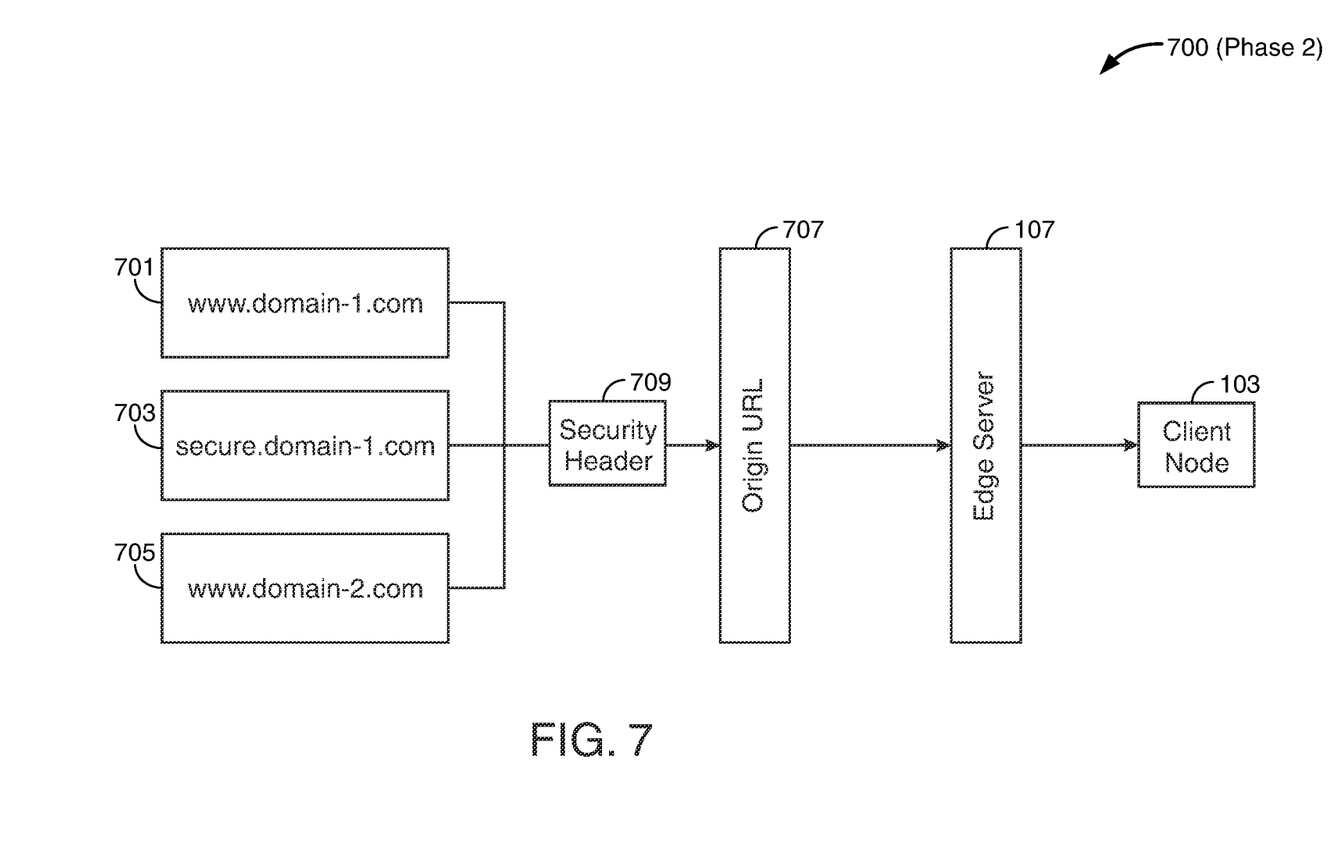
FIG. 7 shows illustrative systems and process flows in accordance with principles of the disclosure.

FIG. 7 shows process 700 for routing content requests for third-party tags to an edge server in the Phase 2 system design. In process 700, requests for third-party tags that will be loaded in connection with webpages 701, 703 and/or 705 are all routed through the origin URL 707 via security header 709. Origin URL may correspond to webpage 106. Each of webpages 701, 703 and/or 705 may be a mirror site or otherwise host content associated with webpage 106 (e.g., www.bofa.com, shown above in FIG. 1). Security header 709 allows edge server 107 to serve appropriate content (e.g., third-party tags 503) to client node 103 associated with webpages 701, 703 and/or 705 without exposing the servers hosting webpages 701, 703 and/or 705 to client node 103 or any other unintended audiences.

Thus, apparatus and methods for ARTIFICIAL INTELLIGENCE INTEGRATION OF THIRD-PARTY SOFTWARE INTO LARGE-SCALE DIGITAL PLATFORMS have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An artificial intelligence ("AI") content delivery and integration system comprising:
    a client node that submits a request for digital content hosted on a first domain; and
    an edge server on the first domain configured to:
        ingest the request;
        maintain a set of tags that will execute on the client node in connection with display of the digital content, wherein execution of at least one member of the set requires communication between the client node and a second domain;
        transfer the at least one member of the set from the edge server to the client node;
        receive a third-party communication request at the edge server;

from the at least one member of the set executing on the client node; and
addressed to the second domain; and
fulfill the third-party communication request by creating a communication bridge from the client node to the second domain via the edge server;
wherein the creating of the communication bridge comprises:
repackaging the third-party communication request into a first-party communication request that conforms to protocols operative on the first domain;
transmitting the first-party communication request from the edge server to the second domain; and
communicating with the second domain using security and communication protocols that are operative on the first domain such that, from a perspective of the client node, a response to the third-party communication request received from the edge node will be viewed as having originated from the first domain.

2. The AI system of claim 1, wherein:
the edge server passes the request for digital content to a content delivery network ("CDN") that is external to the first domain; and
the CDN instructs the edge server to deliver the at least one member to the client node.

3. The AI system of claim 1, wherein the transfer of the at least one member of the set from the first domain to the client node comprises configuring the edge server to transfer one or more cookies to the client node from a storage location on the first domain.

4. The AI system of claim 1, wherein using the communication bridge, the request for digital content, when received by the client node is processed by a web browser on the client node as originating from the first domain.

5. The AI system of claim 1, wherein:
the third-party communication request is transferred from the client node to the edge server using a first application program interface ("API"); and
the communication bridge transfers the third-party communication request from the edge server to the second domain using a second API.

6. The AI system of claim 5 wherein:
the second domain transfers a response to the third-party communication request from the second domain to the edge server using a third API; and
the edge server transfers the response to the third-party communication request to the client node using the first API.

7. The AI system of claim 1 further comprising:
a testing environment; and
wherein, each member of the set of tags is stored on the edge server only after the testing environment has evaluated each member and determined that each member meets a threshold performance level associated with the first domain.

8. The AI system of claim 7 wherein the edge server logs performance of the at least one member of the set executing on the client node and determines whether the execution of the at least one member on the client node meets the threshold performance level.

9. A federated tag manager system comprising:
an edge server operating in a first domain;
a client node operating in a second domain; and
an artificial intelligence content controller operating in the first domain, and comprising machine executable instructions, that when executed by a processor on a computer system:
load first-party content on the client node;
determine third-party content for loading on the client node;
extract the third-party content from a repository on the first domain;
load the third-party content on the client node;
monitor execution of the third-party content on the client node; and
decommission any of the third-party content that fails to meet a threshold performance level when executing on the client node;
transpile the third-party content from a native format into a secure format authorized for use on the first domain;
utilize automation tools and control systems on the first domain to enforce role-based authentication, separation of duties and code ownership rules in effect on the first domain for the secure format; and
utilize a target application program interface for allowing the third-party content, after being transpiled into the secure format, to interact with a third domain using communication protocols compatible with the native format.

10. The federated tag manager system of claim 9, the artificial intelligence content controller further configured to:
identify the third-party content based on submitting a content request received from the client node to a content delivery network ("CDN");
receive, from the CDN, a list of third-party content that is associated with the content request; and
extract the third-party content included in the list from the repository on the first domain.

11. The federated tag manager system of claim 9, the artificial intelligence content controller further configured to:
identify the third-party content based on a content request received from the client node;
formulate a listing of third-party content that is associated with the content request; and
extract the third-party content included in the list from the repository on the first domain.

12. The federated tag manager system of claim 9, wherein the third-party content is not visible to a user of the client node.

13. The federated tag manager system of claim 9, the artificial intelligence content controller further configured to:
load the third-party content on the client node in response to a first content request received from the client node;
cache the third-party content on the client node;
receive a second content request from the client node; and
in response to the second content request, utilize the cached third-party information to load third-party content associated with the second content request.

14. The federated tag manager system of claim 13, wherein the third-party content is a first instance of third-party content, the artificial intelligence content controller further configured to:
push the first instance of third-party content and a second instance of third-party content into a testing environment; and confirm that the first instance and the second instance of third-party content will not interact with each other such that execution of the first and second instances of third-party content on the client node will both be at a target performance level.

15. The federated tag manager system of claim 9, the artificial intelligence content controller further configured to:

push the third-party content into a testing environment; and confirm that the third-party content, when operating in the testing environment, performs at a target level.

\* \* \* \* \*